United States Patent Office 2,709,171
Patented May 24, 1955

2,709,171
ACRIDONE DERIVATIVES

Roger W. Stoughton, St. Louis, Mo., assignor to Mallinckrodt Chemical Works, St. Louis, Mo., a corporation of Missouri No Drawing. Application July 25, 1952,
Serial No. 300,981

4 Claims. (Cl. 260—279)

This invention relates to acridone derivatives and more particularly to a novel class of acridone derivatives which are useful analeptics and stimulants.

Briefly, the invention is directed to a class of acridone derivatives, having the formula:

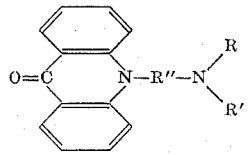

in which R, R' and R" are alkyl radicals, and the acid salts of these acridone compounds.

Among the objects of this invention are the provision of new acridone derivatives; and the provision of compounds of the class described which possess valuable properties as analeptics and stimulants. Other features will be in part apparent and in part pointed out hereinafter.

The invention accordingly comprises the products hereinafter described, the scope of the invention being indicated in the following claims.

In accordance with the present invention it has been found that 10-(dialkylaminoalkyl)-9-acridones, and in particular 10-(2-dimethylaminopropyl)-9-acridone and the acid salts thereof, possess surprising and valuable physiological properties. These compounds have been found to be exceptionally potent stimulants for the central nervous system and can be employed in shock therapy treatment of certain mental disorders. These compounds are not only effective stimulants for the central nervous system and valuable analeptics, but they are also useful, for example, in the treatment of narcotic depression produced by overdosages of sedatives such as the barbiturates. Analeptics heretofore available have not been satisfactory for severe cases of narcotic depression.

The compounds of the present invention are characterized by the presence of a dialkylaminoalkyl grouping in the N-position of an acridone, and may be prepared by the reaction of 9-acridone with the appropriate N,N-dialkyl-2-chloroalkylamine. The compounds are generally used in the form of their acid salts which are readily formed by reaction of the acridone derivatives with an acid.

The following examples illustrate the invention:

Example 1

A mixture of 9-acridone (12 g.) and potassium hydroxide was ground together in a mortar, moistened with anhydrous ethanol (20 ml.), slowly heated to 200° C. over a period of one hour, and then cooled to room temperature. N,N-dimethyl-2-chloropropylamine (20 ml.) was added and the mixture was again heated, this time at 100° C. for four hours. The crude reaction product was then decomposed with water (100 ml.) and acidified with hydrochloric acid. An insoluble portion, consisting of unreacted 9-acridone (5 g.), was recovered. After clarification of the filtrate with charcoal, the crude base was precipitated with alkali. It weighed 8 g. and melted at 112–114° C. Recrystallization of this base from a mixture of benzene and petroleum ether gave 4 g. of pure 10-(2-dimethylaminopropyl)-9-acridone melting at 115–116° C.

Example 2

10-(2-dimethylaminopropyl)-9-acridone (8.4 g.), prepared as in Example 1, was dissolved in anhydrous ethanol and to this solution was added ether (25 ml.) which had been saturated with dry hydrogen chloride. A light yellow crystalline solid was obtained. It was recrystallized from anhydrous ethanol and yielded 9.5 g. of 10-(2-dimethylaminopropyl)-9-acridone hydrochloride, melting at 249–250° C. with decomposition. The hydrochloride is soluble in water, slightly soluble in cold alcohol and insoluble in hydrocarbon solvents.

It is to be understood that 10-(dialkylaminoalkyl)-9-acridones other than 10-(2-dimethylaminopropyl)-9-acridone may also be prepared generally as described in Example 1 and that the salts of other acids conventionally used in pharmaceutical preparations, such as the sulfates, phosphates and tartrates, may be conveniently prepared by conventional procedures similar to that of example 2.

In view of the above, it will be seen that the several objects of the invention are achieved and other advantageous results attained.

As various changes could be made in the above products without departing from the scope of the invention, it is intended that all matter contained in the above description shall be interpreted as illustrative and not in a limiting sense.

I claim:

1. A compound selected from the group consisting of 10-(2-dimethylaminopropyl)-9-acridone and the non-toxic acid salts thereof.
2. 10-(2-dimethylaminopropyl)-9-acridone.
3. The non-toxic acid salts of 10-(2-dimethylaminopropyl)-9-acridone.
4. 10-(2-dimethylaminopropyl)-9-acridone hydrochloride.

References Cited in the file of this patent

Eisleb, Ber. 74B, 1433–50 (1941).